United States Patent [19]

Kretchman

[11] Patent Number: 4,865,366
[45] Date of Patent: Sep. 12, 1989

[54] TOE PANEL RETAINER CLIP FOR DRYER

[75] Inventor: Gerald L. Kretchman, St. Joseph Township, Berrien County, Mich.

[73] Assignee: Whirlpool Corporation, Benton Harbor, Mich.

[21] Appl. No.: 214,942

[22] Filed: Jul. 5, 1988

[51] Int. Cl.⁴ .............................................. E05C 19/06
[52] U.S. Cl. ......................................... 292/86; 24/453; 24/573
[58] Field of Search ....................... 292/69, 71, 80, 86, 292/88, 89, DIG. 1; 24/453, 573

[56] References Cited

U.S. PATENT DOCUMENTS

| | | |
|---|---|---|
| 922,852 | 5/1909 | Cannan .................... 292/87 |
| 1,740,830 | 12/1929 | Parker . |
| 2,113,687 | 4/1938 | Grace ................... 292/86 X |
| 2,123,588 | 7/1938 | Luneke ................. 292/86 X |
| 2,179,307 | 11/1939 | Sywert .................... 220/55 |
| 2,497,896 | 2/1950 | Lyon ....................... 292/80 |
| 2,526,532 | 10/1950 | Bedford, Jr. ............. 24/453 |
| 2,655,072 | 10/1953 | Poupitch . |
| 3,069,541 | 12/1962 | Thomsen et al. ........... 240/147 |
| 3,334,770 | 8/1967 | Stanback ............... 292/87 X |
| 3,841,518 | 10/1974 | Hines ...................... 220/55 |
| 3,970,346 | 7/1976 | Kretschmer ............ 301/37 R |
| 3,971,237 | 7/1976 | Rasmussen .............. 292/87 |
| 4,109,637 | 8/1978 | Droyin ............. 292/DIG. 69 X |

Primary Examiner—Richard E. Moore
Attorney, Agent, or Firm—Hill, Van Santen, Steadman & Simpson

[57] ABSTRACT

A retainer clip which is particularly useful in the environment of a dryer or other appliance to hold a pivotable toe panel stationary relative to the appliance frame as well as to locate it horizontally and vertically. The clip has a first spring portion in a U-shaped form which is received in an opening in the toe panel and a second spring portion in a V-shaped form which is received in a front panel rigidly secured to the frame. A free end of the second spring portion engages against a lower wall of the front panel of the appliance and a distal end is bent so that a tool can be used to disengage the clip from the front panel.

17 Claims, 2 Drawing Sheets

TOE PANEL RETAINER CLIP FOR DRYER

BACKGROUND OF THE INVENTION

The present invention relates to a retainer clip for selectively retaining two parts which are pivotally movable relative to one another and more particularly to a retaining clip for use with a toe panel in an appliance.

Oftentimes appliances such as dryers used in the home have a toe panel which is a relatively short panel at the bottom of the front wall of the appliance cabinet which is removable to provide access to various working parts or controls in the use of a tool, in order to avoid access to this area by children and to prevent accidental dislodging of the toe panel.

U.S. Pat. No. 2,113,687 discloses a meter closure fastener which includes a hook formed of a spring material, the shank being connected to the meter box by a rivet at one end and having an outturned angular end at an opposite, free end which engages into a slot of a tubular keeper. Access to the plate is available only through an opening which is normally covered by a material such as a sheet of glass so that the glass must first be broken in order to gain access to the latch. The latch is then operated by a tool such as a screw driver to disengage the angular end of the hook from the slot of the keeper. This permits a first half of the box to pivot away from a second half of the box.

U.S. Pat. No. 2,179,307 discloses a refrigerator cabinet having a removable panel which has an inwardly turned flange, around the entire inside perimeter of the panel. A pair of springs are provided at each lateral lower corner of the refrigerator cabinet which have hooked ends that are first engaged into the upturned flange along a lower edge of the removable panel. The panel is then lifted upwardly against the spring such that the upper downwardly turned flange is captured in the groove formed in the upper edge of the resilient block provided at each lateral upper edge of the opening which the panel is to cover. Removal of the panel takes place in the opposite order, that is by first lifting the top downturned flange out of the grooves and then moving the panel downwardly to release the lower flange from the springs. No tools are required for removal of the panel.

U.S. Pat. No. 3,841,518 discloses a safety latch for boxes which includes a box and a hinging cover with a spring latch mounted inside of the box by means of a bolt. The spring latch has marginal portions turned over which engage in recesses in a bracket secured to a pivotable lid of the box. The latch is released by means of a tool such as a screw driver which is inserted through an opening formed in the box lid, an opening 24 in the bracket end and an opening 31 in the spring latch.

With respect to a toe panel for an appliance, it is important that the toe panel be retained in a specific horizontal and vertical position relative to the cabinet. It would be an advantageous development if a fastening or retaining device were provided for such a panel which would provide the horizontal and vertical locating of the panel relative to the frame.

SUMMARY OF THE INVENTION

It is an object of the present invention to provide a retaining means for selectively retaining two parts which are pivotally movable relative to one another and which retaining means requires the use of a tool to disengage the retaining means from an adjacent part, the retaining means being retained by a first spring portion in a first part and engaging the second part with a second spring portion and the retaining means horizontally and vertically locating the second part relative to the first part.

It is a further object of the invention to provide a retaining clip for the toe panel of an appliance wherein the clip is held o the toe panel which pivots relative to a frame of the appliance, the clip having a spring portion which engages with a part of the frame and which requires use of a tool to disengage the clip from the frame.

In a preferred embodiment of the invention, a pair of spring clips are provided which are identical in configuration and which are received in apertures in a top flange of a toe panel for an appliance, such as a dryer, the clips being formed of a resilient material such as spring steel and having a configuration such that a free end of the clip is spring biased against a portion of the frame of the appliance and includes a detent which normally locks the clip to the appliance. A tool, such as a screw driver, must be used to press the free end of the clip away from its engagement at the detent in order to permit the toe panel to pivot relative to the frame to provide access to the various components located within the appliance cabinet and normally behind the toe panel.

DETAILED DESCRIPTION OF THE PREFERRED EMBODIMENTS

Although the present invention is useful in many environments, particularly where two parts are pivotally movable relative to another and wherein a clip is used for selectively retaining the two parts together, the invention finds particular utility in the environment of an appliance, such as a dryer, wherein a toe panel portion of the cabinet is pivotally movable relative to the remainder of the cabinet. Therefore, the invention will be described with respect to such an environment although the invention should not be construed as being limited to such an environment.

Figure 1:
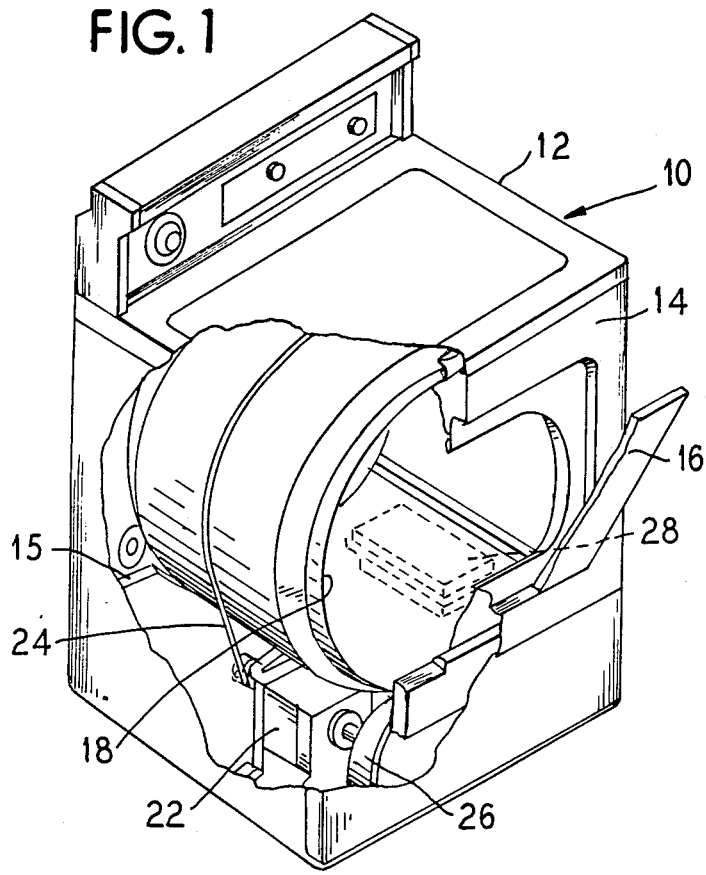
FIG. 1 is a perspective view of an automatic dryer incorporating the principles of the present invention.

FIG. 1 illustrates an automatic dryer generally at 10 having a generally rectangular cabinet 12 with a front panel 14 secured to a frame 15 of the dryer. The front panel 14 has an openable door 16 providing access to the interior of a rotatable drum 18. A removable toe panel 20 is provided along the lower portion of the front side of the cabinet. Accessible upon removal of the toe panel 20 are various components such as an electric motor 22 used to rotate the drum through a belt drive 24 and a blower 26 used to cause a flow of heated air through the interior of the drum 18. A heater means 28 which can either be an electrical heater or a gas burner may also be located beneath the drum 18 and accessible upon removal of the toe panel 20.

Although it is highly desireable for the to panel to be quickly and easily assembled, both from a manufacturing standpoint as well as for ease to the user or service personnel after access to the lower interior portion of the cabinet is completed, it is also desireable to make the removal of the toe panel dependent upon the use of a tool so that accidental removal of the toe panel is not possible and particularly so that children cannot access the components normally shielded by the toe panel.

Figure 2:
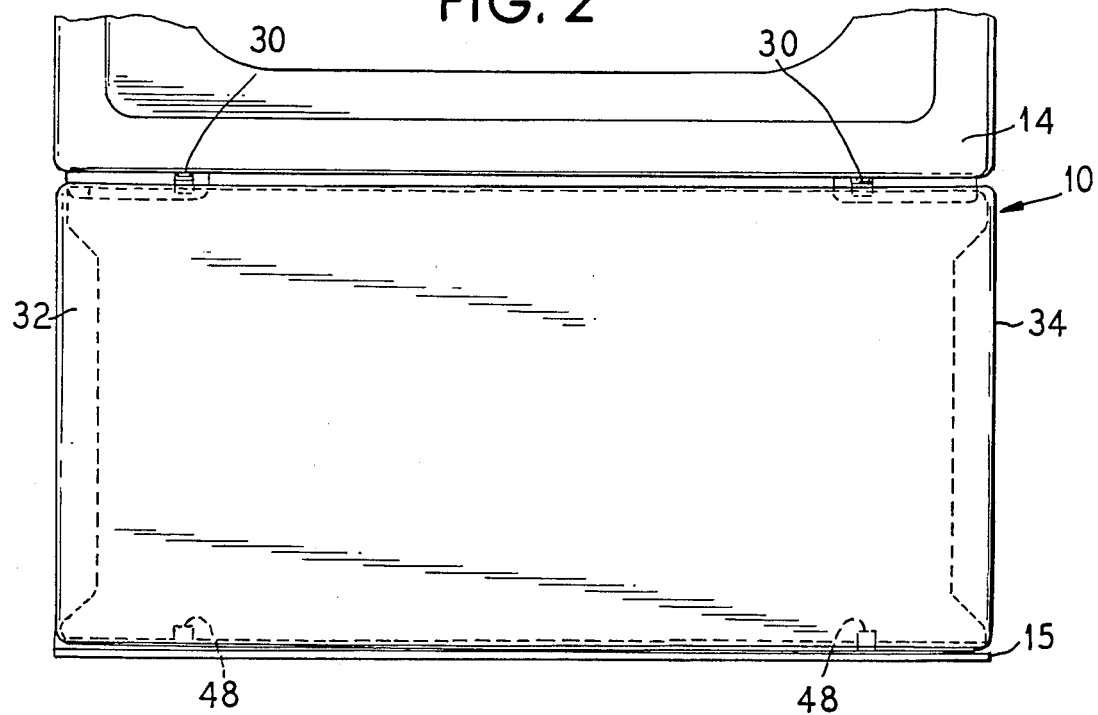
FIG. 2 is a front elevational view of the lower cabinet portion of the dryer of FIG. 1.
Figure 4:
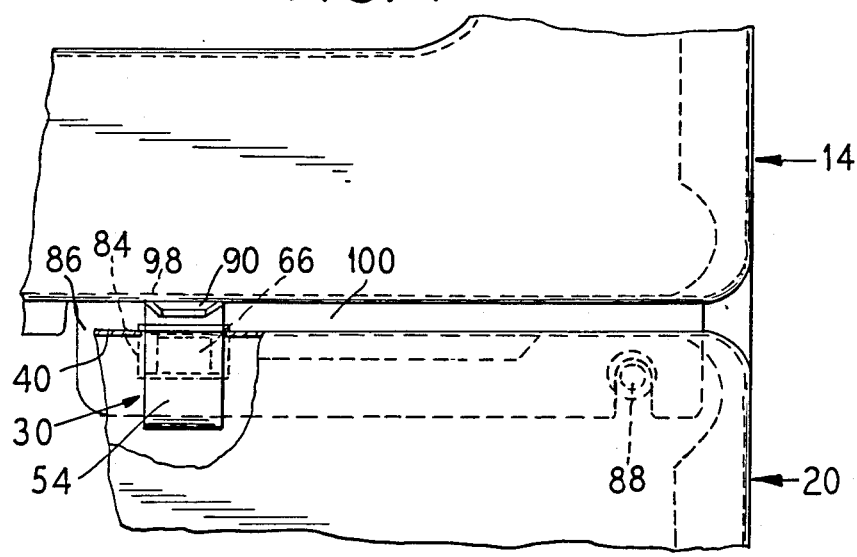
FIG. 4 is a partial front elevational view partially broken away to show the placement of the retaining clip relative to the toe panel and appliance frame.

In order to permit such easy assembly and yet restrict removal of the toe panel, the present invention contemplates the provision of a retaining clip 30 shown in greater detail in FIGS. 2–7. Two retaining clips 30 are provided and are captured adjacent to lateral ends 32, 34 of the toe panel as best seen in FIG. 2 in order to provide a secure holding of the toe panel relative to the cabinet frame 15.

Figure 3:
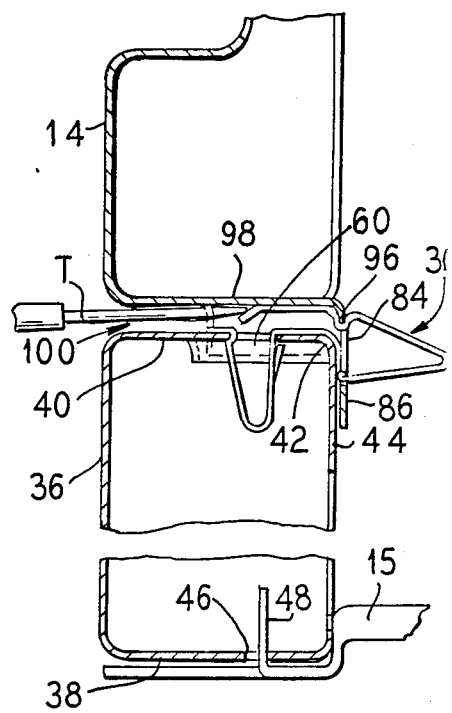
FIG. 3 is a side sectional view of the toe panel and retaining clip in a latched position.

The toe panel, as shown in FIG. 3, has a planar front face 36 and inwardly turned lateral ends 32, 34 as well as an inwardly turned bottom wall 38 and an inwardly turned top wall 40. The top wall also has at a rear end 42 a downwardly turned rear wall 44 which extends only a short distance down from the top wall 40.

A pair of apertures 46 are provided in the bottom wall 38 to receive upstanding tabs 48 formed in the dryer frame 15 which permits the toe panel to be inserted onto the tabs and permits a pivoting of the toe panel relative to the dryer frame while the toe panel is held on the frame.

Figure 5:
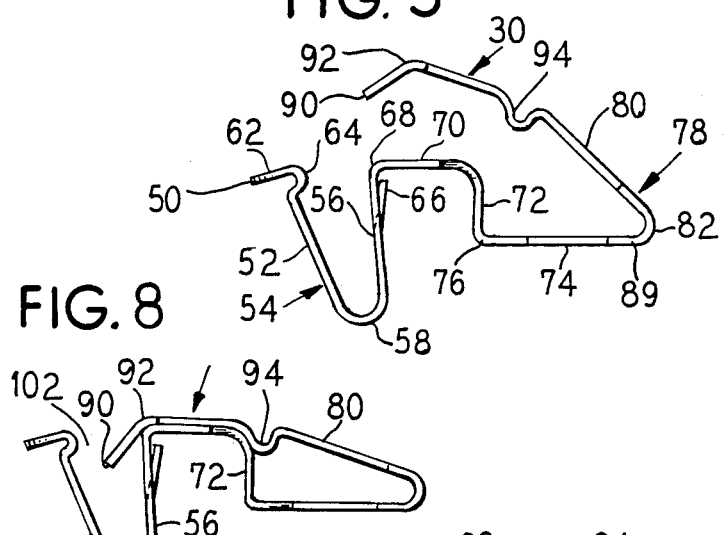
FIG. 5 is a side elevational view of the retaining clip in a free or non-compressed position.
Figure 6:
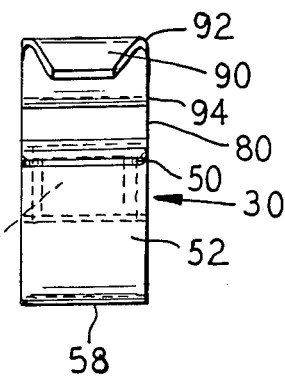
FIG. 6 is a front elevational view of the retaining clip.
Figure 7:
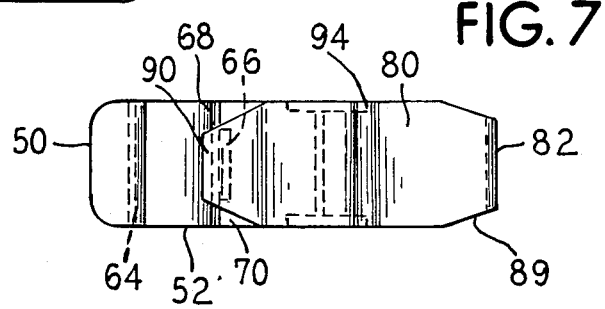
FIG. 7 is a top elevational view of the retaining clip.

The retaining clip 30, which is preferably formed from a resilient material such as spring steel, is shown in greater detail in FIGS. 5–7 where it is seen that the clip has a first end 50 forming an end of a first leg 52 of a U-shaped first spring portion 54 having a second leg 56 and a bight 58 therebetween. The two legs and bight of the U-shaped portion 54 are inserted through an opening 60 in the top wall 40 of the toe panel 36. The first leg 52 at the end 50 is outwardly turned in the form of a flange 62 which overlies the top wall 40. The flange 62 connects with the leg through the intermediary of a detent 64 which, due to the spring nature of the retaining clip assists in holding the clip in the opening 60. The second leg 56 of the U-shaped portion 54 includes a tab 66 bent slightly outwardly just below a top end 68 of the second leg, the tab being captured below the top wall 40 of the toe panel. The front to back depth of the opening 60 is slightly smaller than the free or non-compressed distance between the tab 66 and detent 64 such that the U-shaped portion 54 must be compressed in order to fit within the opening 60. Thus, due to resilient and springlike nature of the retaining clip, the tab 66 and detent 64 act in concert to hold the retaining clip in the opening 60 of the toe panel 36. Preferably the opening 60 has a width just slightly greater than the width of the retaining clip 30 so that the clip will be held in a relatively immobile horizontal position on the toe panel 36.

The retaining clip has a horizontal portion 70 extending from the upper end 68 of the second leg which overlies the top of the top wall 40 and also includes a downwardly turned vertical leg 72 which overlies the rear wall 44 of the toe panel. The vertical leg 72 connects with a horizontal leg 74 at a bend 76, the leg 74 comprising the first leg of a V-shaped second spring portion 78 having a second leg 80 and an intermediary bight 82. The V-shaped portion extends through an opening 84 (FIG. 3) in a downwardly turned flange 86 of the front cabinet panel 14 which is secured to the dryer frame by bolts 88 (FIG. 4) so as to be stationary with the frame. The width of the retaining clip is reduced by tapers 89 at the V-shaped bight 82 to assist in insertion of the V-shaped portion 78 into the opening 60. The opening 60 is only slightly wider than the width of the clip, such that once the clip is inserted into the opening, the toe panel 36 will be held in a predetermined horizontal position relative to the front panel 14 and dryer frame 15.

The second leg 80 of the V-shaped portion 78 extends forwardly to overlie the U-shaped portion 54 and terminates at a second distal end 90 which proceeds at a slight downward angle from a bend 92. Midway along the leg is a detent 94 which, when the V-shaped portion is inserted through the opening 84, captures an edge 96 of the opening to secure the clip in place. The height of the opening 84 is slightly smaller than the free or non-compressed distance from the detent 94 to the part of the leg 74 so that the V-shaped portion acts as a spring to urge the detent 94 into retaining engagement with the edge 96 of the opening 84. The portion of the leg distal of the detent 94 presses against a bottom wall 98 of the front panel 14. The spring force of the V-shaped portion 78 pressing through the second leg 80 against the bottom wall 98 of the front panel causes the toe panel to remain firmly seated against the frame 15 of the dryer along the bottom wall 38 of the toe panel. In this manner, the retaining clip assists in locating and retaining the toe panel in a fixed vertical position relative to the front pane and dryer frame.

Figure 8:
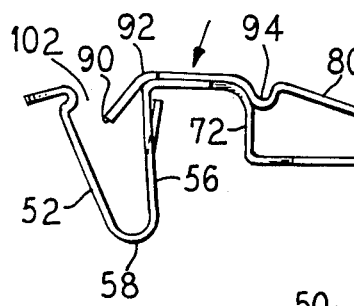
FIG. 8 is a side elevational view of the retaining clip in a fully compressed position.

The angled end 90 permits a tool T to be inserted in a space 100 between the top wall 40 of the toe panel 36 and the bottom wall 98 of the front panel 14 and between the bottom wall 98 of the front panel 14 and the angled end 90 of the retaining clip 30 so as to disengage the detent 94 from the edge 96 of the opening 84. When the detent is disengaged, the toe panel is free to pivot about its bottom wall connection with the tabs 48 of the dryer frame so that the panel can be removed and access to the interior of the cabinet is possible. FIG. 8 illustrates the retaining clip 30 with the V-shaped portion 78 fully compressed as it would be when the clip is being disengaged from the front panel 14. The bent distal end 90 is received in a gap 102 between the top ends of the two legs 52, 56 of the U-shaped portion. The detent 94 is slightly rearward of the vertical leg 72 to provide sufficient clearance for the leg 80 to move downwardly away from the bottom wall 98 of the front panel 14 to permit disengagement of the detent 94 from the front panel bottom flange opening 84.

To reassemble the toe panel onto the dryer cabinet, the apertures 46 in the bottom wall of the toe panel must be placed over the upstanding tabs 48 of the dryer frame, then the toe panel is merely pivoted back into place. As this occurs, the V-shaped portion 78 of the retaining clip will pass through the opening 84 in the front panel flange 86 and, upon sufficient pivoting of the toe panel 36, the V-shaped portion will be compressed and the detent 94 will capture the edge 96 of the opening 84 and will secure and retain the toe panel in vertical alignment with the front panel of the dryer cabinet. The toe panel will be held in this place and will be prevented from accidental removal by the retaining clip. Removal is possible only through the use of a tool having a portion which can be inserted between the bottom wall 98 of the front panel 14 and the angled end 90 of the retaining clip.

Thus it is seen that the present invention provides a retaining clip for selectively retaining two parts, the toe panel 36 and front panel 14 (and stationary dryer frame 15), which are pivotally movable relative to one another and which requires the use of a tool to disengage the clip from an adjacent part. The clip 30 is retained by a first spring portion, being the U-shaped portion 54 in the first toe panel part and the clip engages the second front panel part with a second spring portion, the V-shaped portion 78. The clip also horizontally and vertically locates the first and second parts relative to each other due to the vertical downward biasing of the toe panel 36 against the dryer frame and the positioning of the retaining clip 30 in the openings 84 in the front panel flange 86.

As is apparent from the foregoing specification, the invention is susceptible of being embodied with various alterations and modifications which may differ particularly from those that have been described in the preceeding specification and description. It should be understood that I wish to embody within the scope of the patent warranted hereon all such modifications as reasonably and properly come within the scope of my contribution to the art.

The embodiments of the invention in which an exclusive property or privilege is claimed are defined as follows:

1. A retainer clip for selectively retaining two parts which are pivotally movable relative to one another comprising:
   a first spring portion retaining said clip in said first part;
   a second spring portion retainingly engaging against said second part to horizontally and vertically locate said first and second parts relative to one another;
   said second spring portion including a leg with a free end which presses against said second part and having a distal portion engageable by a tool to release said retaining clip from engagement with said second part.

2. A retainer clip according to claim 1, wherein said first spring portion comprises a U-shaped portion having two legs and an intermediate bight, said U-shaped portion being sized to fit into an opening in said first part.

3. A retainer clip according to claim 2, wherein one of said legs includes a detent to engage an edge of said opening to hold said retainer clip in said first part.

4. A retainer clip according to claim 1, wherein said second spring portion comprises a V-shaped portion having two legs and an intermediate bight, said V-shaped portion being sized to fit into an opening in said second part.

5. A retainer clip according to claim 4, wherein one of said legs includes a detent to engage an edge of said opening to hold said retainer clip in said second part.

6. An appliance cabinet assembly comprising:
   an appliance frame having a first wall at least at a front edge of said frame and a second wall spaced from said first wall, said second wall having at least one opening therein;
   a toe panel having a first wall pivotably attachable to said appliance frame first wall and a second wall with at least one opening therein;
   at least one retaining clip having a first spring portion engaged with said opening in said second wall of said toe panel and a second spring portion engaged with said opening in said second wall of said appliance frame;
   said second spring portion including a leg with free end which presses against said second wall of said appliance frame and has a distal portion engageable by a tool to release said retaining clip from engagement with said appliance frame.

7. An appliance cabinet assembly according to claim 6, wherein said dryer frame has two laterally spaced tabs projecting from said first frame wall; said first toe panel wall has two laterally spaced openings for receiving said tabs; said second toe panel wall has two laterally spaced openings therein for receiving two of said retaining clips; and said second frame wall has two laterally spaced openings therein for receiving two of said retaining clips.

8. An appliance cabinet assembly according to claim 7, wherein said second toe panel top wall opening and said second frame wall opening are in alignment when said frame tab is engaged with said first toe panel wall opening.

9. An appliance cabinet assembly according to claim 6, wherein said first spring portion has a width just slightly less than a width of said opening in said second toe panel wall.

10. An appliance cabinet assembly according to claim 6, wherein said retaining clip is formed of a strip of resilient material, said strip having a width just slightly less than a width of said opening in said second toe panel wall and said opening in said second frame wall.

11. An appliance cabinet assembly according to claim 6, wherein said first spring portion comprises two legs and an intermediate bight, at least one of said legs having a detent means for engaging with an edge of said opening in said second toe panel wall.

12. An appliance cabinet assembly according to claim 6, wherein said leg of said second spring portion includes a detent means for engaging with an edge of said opening in said second appliance wall.

13. A dryer cabinet assembly comprising:
   a dryer frame having a bottom wall at least at a front edge of said frame, said bottom wall having at least one tab projecting upwardly therefrom;
   a front panel having a bottom wall spaced above said bottom wall of said dryer frame and a bottom vertical flange secured to said frame and extending downwardly from said front panel bottom wall, said vertical flange having at least one opening therein;
   a toe panel having a bottom wall with at least one opening therein to receive said tab from said dryer frame bottom wall and a top wall with at least one opening therein;
   at least one retaining clip formed from a resilient material having a U-shaped portion with a width slightly less than a width of said toe panel top wall opening such that said U-shaped portion is engagingly received in said opening, and a V-shaped portion with a width slightly less than a width of said front panel bottom flange opening such that said V-shaped portion is engagingly received in said flange opening; said V-shaped portion including a leg with a free end which overlies said U-shaped portion, presses against said bottom wall of said front panel and has a distal portion engageable by a tool to release said retaining clip from engagement with said front panel.

14. A dryer cabinet assembly according to claim 13, wherein said dryer frame has two laterally spaced tabs projecting upwardly from said frame bottom wall; said toe panel bottom wall has two laterally spaced openings for receiving said tabs; said toe panel top wall has two laterally spaced openings therein for receiving two of said retaining clips; and said front panel bottom flange has two laterally spaced openings therein for receiving two of said retaining clips.

15. A dryer cabinet assembly according to claim 13, wherein said toe panel top wall opening and said front panel bottom flange opening are in vertical alignment when said frame tab is engaged with said toe panel bottom wall opening.

16. A dryer cabinet assembly according to claim 13, wherein said U-shaped portion comprises two legs and an intermediate bight, at least one of said legs having a detent means for engaging with an edge of said toe panel top wall opening.

17. A dryer cabinet assembly according to claim 13, wherein said leg of said second spring portion includes a detent means for engaging with an edge of said front panel bottom flange opening.

* * * * *